United States Patent
Cunha et al.

(10) Patent No.: US 10,288,733 B2
(45) Date of Patent: May 14, 2019

(54) METHOD FOR FORECASTING PARKING AREA AVAILABILITY OF A STREET SECTION

(71) Applicant: Robert Bosch GmbH, Stuttgart (DE)

(72) Inventors: Carlos Cunha, Palo Alto, CA (US); Ruobing Chen, Palo Alto, CA (US); Philipp Mayer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/652,779

(22) Filed: Jul. 18, 2017

(65) Prior Publication Data

US 2017/0329007 A1  Nov. 16, 2017

Related U.S. Application Data

(63) Continuation-in-part of application No. 15/400,541, filed on Jan. 6, 2017, now Pat. No. 10,074,277, which
(Continued)

(30) Foreign Application Priority Data

Apr. 28, 2015  (DE) .................. 10 2015 207 804

(51) Int. Cl.
| | | |
|---|---|---|
| G06K 9/00 | (2006.01) | |
| G06K 9/62 | (2006.01) | |
| G08G 1/01 | (2006.01) | |
| G08G 1/14 | (2006.01) | |

(Continued)

(52) U.S. Cl.
CPC ........ *G01S 15/931* (2013.01); *G01C 21/3685* (2013.01); *G01S 13/08* (2013.01);
(Continued)

(58) Field of Classification Search
CPC .......... G08G 1/14; G08G 1/147; G08G 1/144; G08G 1/143; G01S 13/08; G01S 15/08;
(Continued)

(56) References Cited

U.S. PATENT DOCUMENTS

| | | | |
|---|---|---|---|
| 7,739,046 B2 | 6/2010 | Satonaka | |
| 2007/0075875 A1* | 4/2007 | Danz | B60Q 9/006 340/932.2 |

(Continued)

FOREIGN PATENT DOCUMENTS

| | | |
|---|---|---|
| DE | 102004062021 A1 | 7/2006 |
| DE | 102008028550 A1 | 12/2009 |

(Continued)

OTHER PUBLICATIONS

Rajabioun et al., "On-Street and Off-Street Parking Availability Prediction Using Multivariate Spatiotemporal Models", IEEE Transactions on Intelligent Transportation Systems, vol. 16, No. 5, Oct. 2015, pp. 2913-2924.

*Primary Examiner* — Michael J Zanelli
(74) *Attorney, Agent, or Firm* — Gerard Messina

(57) ABSTRACT

A method for aiding finding of available parking areas of a street section includes receiving data corresponding to parking areas situated in a street section, the data including information ascertained by an ascertaining vehicle driving through the street section and information received from a server, determining an instantaneous occupancy estimate of the street section based on the received data, calculating a forecasted occupancy estimate based on the instantaneous occupancy estimate using a timer series forecasting model, and generating a display representation of the calculated forecasted occupancy estimate. The method includes receiving the data and determining the occupancy estimate, for example, each time an ascertaining vehicle drives through the street.

20 Claims, 5 Drawing Sheets

Related U.S. Application Data is a continuation of application No. 14/852,089, filed on Sep. 11, 2015, now Pat. No. 9,542,845, application No. 15/652,779, which is a continuation-in-part of application No. 15/135,194, filed on Apr. 21, 2016, now Pat. No. 9,747,791.

(51) Int. Cl.

| | | |
|---|---|---|
| *G01C 21/36* | (2006.01) | |
| *G01S 13/08* | (2006.01) | |
| *G01S 13/93* | (2006.01) | |
| *G01S 15/08* | (2006.01) | |
| *G01S 15/93* | (2006.01) | |
| *G01S 17/08* | (2006.01) | |

(52) U.S. Cl.
CPC ............ *G01S 13/931* (2013.01); *G01S 15/08* (2013.01); *G01S 17/08* (2013.01); *G06K 9/00812* (2013.01); *G06K 9/6278* (2013.01); *G08G 1/0112* (2013.01); *G08G 1/0129* (2013.01); *G08G 1/0133* (2013.01); *G08G 1/0141* (2013.01); *G08G 1/14* (2013.01); *G08G 1/143* (2013.01); *G08G 1/144* (2013.01); *G08G 1/147* (2013.01); *G01S 2013/9314* (2013.01); *G01S 2013/9385* (2013.01); *G01S 2015/934* (2013.01); *G01S 2015/935* (2013.01); *G01S 2015/937* (2013.01)

(58) Field of Classification Search
CPC ...... G01S 2015/934; G01S 2013/9385; G06K 9/00812
See application file for complete search history.

(56) References Cited

U.S. PATENT DOCUMENTS

| | | | |
|---|---|---|---|
| 2011/0013201 A1* | 1/2011 | Scherl | G01S 17/936 356/628 |
| 2014/0085112 A1 | 3/2014 | Gruteser | |
| 2014/0097971 A1 | 4/2014 | Barth | |
| 2014/0340242 A1* | 11/2014 | Belzner | G08G 1/14 340/932.2 |
| 2014/0372185 A1 | 12/2014 | Ganot | |
| 2015/0088790 A1* | 3/2015 | Chidlovskii | G06Q 30/0202 706/12 |
| 2015/0242695 A1 | 8/2015 | Fan et al. | |
| 2015/0379873 A1 | 12/2015 | Tippelhofer et al. | |
| 2016/0098929 A1 | 4/2016 | Nakhjavani | |
| 2016/0111004 A1* | 4/2016 | Delmas | G08G 1/147 340/932.2 |

FOREIGN PATENT DOCUMENTS

| | | |
|---|---|---|
| DE | 102009028024 A1 | 2/2011 |
| DE | 102013018721 | 6/2014 |
| DE | 102014009627 | 11/2014 |
| EP | 2082386 A1 | 7/2009 |
| JP | 4705259 B2 | 6/2011 |
| JP | 4741394 B2 | 8/2011 |
| WO | 2008061540 A1 | 5/2008 |
| WO | 2010132677 A1 | 11/2010 |
| WO | 2012/091628 | 2/2012 |

\* cited by examiner

METHOD FOR FORECASTING PARKING AREA AVAILABILITY OF A STREET SECTION

CROSS-REFERENCE TO RELATED APPLICATIONS

The present application is a continuation-in-part of U.S. patent application Ser. No. 15/400,541 filed Jan. 6, 2017, which is a continuation of U.S. patent application Ser. No. 14/852,089 filed Sep. 11, 2015 and issued on Jan. 10, 2017 as U.S. Pat. No. 9,542,845, and the present application is a continuation-in-part of U.S. patent application Ser. No. 15/135,194 filed Apr. 21, 2016, the contents of each of which are hereby incorporated by reference herein in their entireties.

FIELD OF THE INVENTION

The present invention relates generally to predicting parking areas available for a vehicle, and more specifically, to predicting available parking areas of a street section based on historical occupancy estimates.

BACKGROUND

Various methods are known in the related art to detect open parking areas for vehicles with the aid of distance based sensors (e.g., ultrasonic sensors, laser sensors, radar sensors, stereo video cameras, etc.). Such methods are known for example from DE 10 2004 062 021 A1, DE 10 2009 028 024 A1, and DE 10 2008 028 550 A1.

SUMMARY

While methods of detecting open parking areas provide information of parking areas actually detected as being available at a current moment in time, the methods do not provide a prediction of parking availability at a future time and also do not provide information on availability without a present detection. That is, the methods discussed in the related art provide information related to parking areas that are available at the particular moment in time when the parking area is detected but are unable to predict or forecast the availability of parking areas, e.g., at a later point in time. Several disadvantages arise from the related methods, for example as follows. First, if a driver uses the related methods to decide where to go to park the driver's vehicle, when the driver reaches the desired parking area, the parking area may have become unavailable. Second, by providing only the available parking areas at the particular moment in time when the parking areas were detected does not allow a driver to plan in advance of the need to park a vehicle.

Example embodiments of the present application provide methods and systems to predict availability of parking areas for a vehicle of a street section based on historical occupancy estimates.

According to an example embodiment of the present invention, a method for predicting parking areas of a street includes receiving data corresponding to parking areas situated in a street section, the data being ascertained by an ascertaining vehicle driving through the street section; determining, by processing circuitry, an instantaneous occupancy estimate of the street section based on the received data; calculating, by the processing circuitry, a forecasted occupancy estimate based on the instantaneous occupancy estimate, the forecasted occupancy estimate being calculated using time series forecasting models; and displaying the calculated forecasted occupancy estimate. In an example embodiment, the steps of receiving data and determining the instantaneous occupancy based on the received data are repetitively performed each time at least one of the ascertaining vehicle and an additional ascertaining vehicle drives through the street section.

In an example embodiment, the received data or otherwise obtained data includes: 1) a total number of unoccupied parking areas; 2) an estimated number of historically falsely detected parking areas; and 3) a total number of parking areas located on the street section.

In an example embodiment, the received data or otherwise obtained data includes: 1) an average length of a vehicle; 2) lengths of determined unoccupied parking areas; 3) lengths of the areas of the estimated number of historically falsely detected parking areas; and 4) a total length of the street section.

In an example embodiment, the received data or otherwise obtained data includes: 1) a length of a vehicle attempting to park; 2) lengths of determined unoccupied parking areas; 3) lengths of the areas of the estimated number of historically falsely detected parking areas; and 4) a total length of the street section.

In an example embodiment, the forecasted occupancy estimate is calculated using a Seasonal Auto-Regressive Integrated Moving Average (SARIMA) model. In an example embodiment, the forecasted occupancy estimate is visually displayed on a map using a color scale to visually represent a level of occupancy of the street section.

In example embodiment, the forecasted occupancy estimate is modified based on an external event impacting the occupancy of the street section. In an example embodiment, a confidence level of the forecasted occupancy estimate is displayed.

Example embodiments of the present invention relate to a server system for predicting parking areas of a street section, the server including a database, and a processing unit for predicting parking areas of a street section, the processing unit performing the following: receiving data corresponding to parking areas situated in a street section, the data being ascertained by an ascertaining vehicle driving through the street section, determining an instantaneous occupancy estimate of the street section based on the received data; and, using time series forecasting models, calculating a forecasted occupancy estimate based on the instantaneous occupancy estimate.

Example embodiments of the present invention relate to a non-transitory computer readable medium on which are stored instructions that are executable by a computer processor and that, when executed by the processor, cause the processor to perform a method for predicting parking areas of a street section, the method including: receiving data corresponding to parking areas situated in a street section, the data being ascertained by an ascertaining vehicle driving along the street section; determining, by the processor, an instantaneous occupancy estimate of the street section based on the received data; calculating, by the processor and using timer series forecasting models, a forecasted occupancy estimate based on the instantaneous occupancy estimate; and displaying the calculated forecasted occupancy estimate.

These and other features, aspects, and advantages of the present invention are described in the following detailed description in connection with certain exemplary embodiments and in view of the accompanying drawings, throughout which like characters represent like parts. However, the detailed description and the appended drawings describe and illustrate only particular example embodiments of the invention and are therefore not to be considered limiting of its scope, for the invention may encompass other equally effective embodiments.

DETAILED DESCRIPTION

Figure 1:
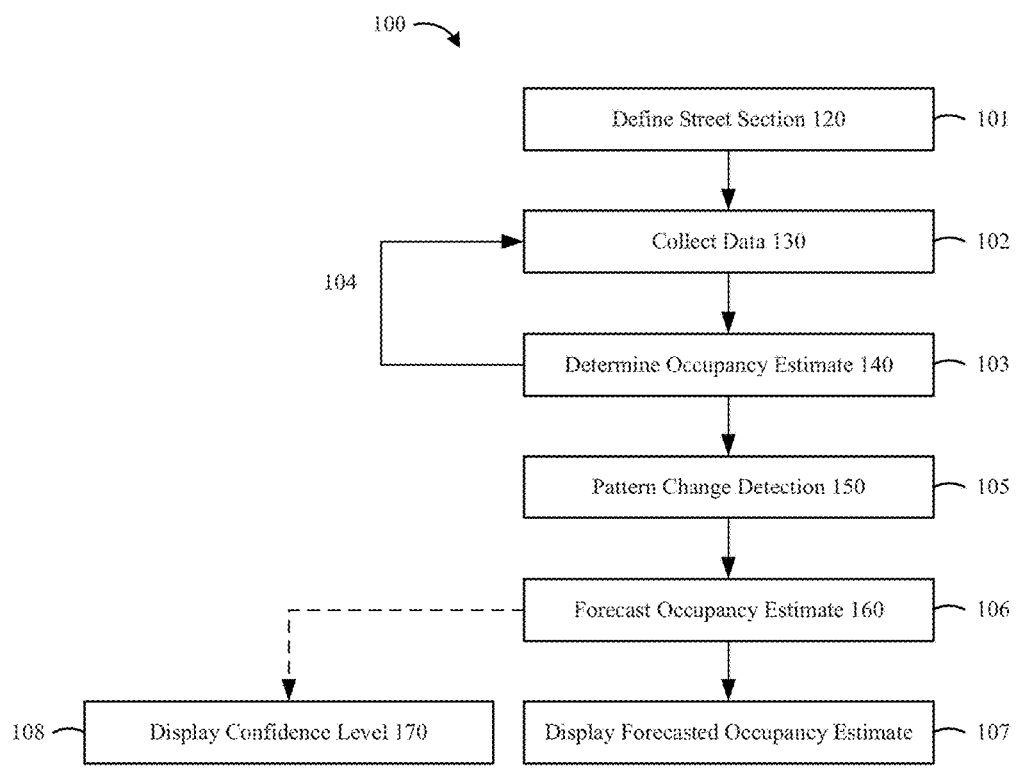
FIG. 1 is a flowchart depicting a method for predicting parking areas of a street section, according to an example embodiment of the present invention.

FIG. 1 is a flowchart for method 100 for predicting an availability of parking areas of a street section based on historical occupancy estimates, according to an example embodiment.

At step 101, street section 120 is identified. Street section 120 can be a street section that has predefined, marked (i.e., painted) parking areas. Street section 120 can alternatively be a street section that does not have predefined parking areas. At step 102, data 130 corresponding to the particular street section is collected over a period of time. Data 130 is collected from various sensors located on vehicles that travel through street section 120 and can include information related to, inter alia, a number of the parking areas, e.g., predefined parking areas; a number of the parking areas that are unoccupied; a number of the parking areas that are occupied; any obstacles that might be present along a vehicle's travel path through street section 120; a length of the parking areas; a length of the unoccupied parking areas; and the length of each detected obstacle. At step 103, occupancy estimate 140 is calculated based on collected data 130. In an example, occupancy estimate 140 is determined based on a count occupancy estimate, a length occupancy estimate, or a car-based occupancy estimate, as is described in detail below.

In an example embodiment, steps 102 and 103 are performed in a loop so that, after completing step 103, method 100 can return to step 102 to collect data 130 for street section 120 at a different point in time. This loop can continue in parallel to execution of steps 105-108.

Data 130, obtained in 102 of the loop, can be collected from one or more vehicles traveling down the same street section. In this manner, data 130 is collected over a period of time so as to establish a collection of data 130 over the particular period of time corresponding to the particular street section. Furthermore, each time data 130 is collected, a corresponding occupancy estimate 140 can be determined.

Figure 2:
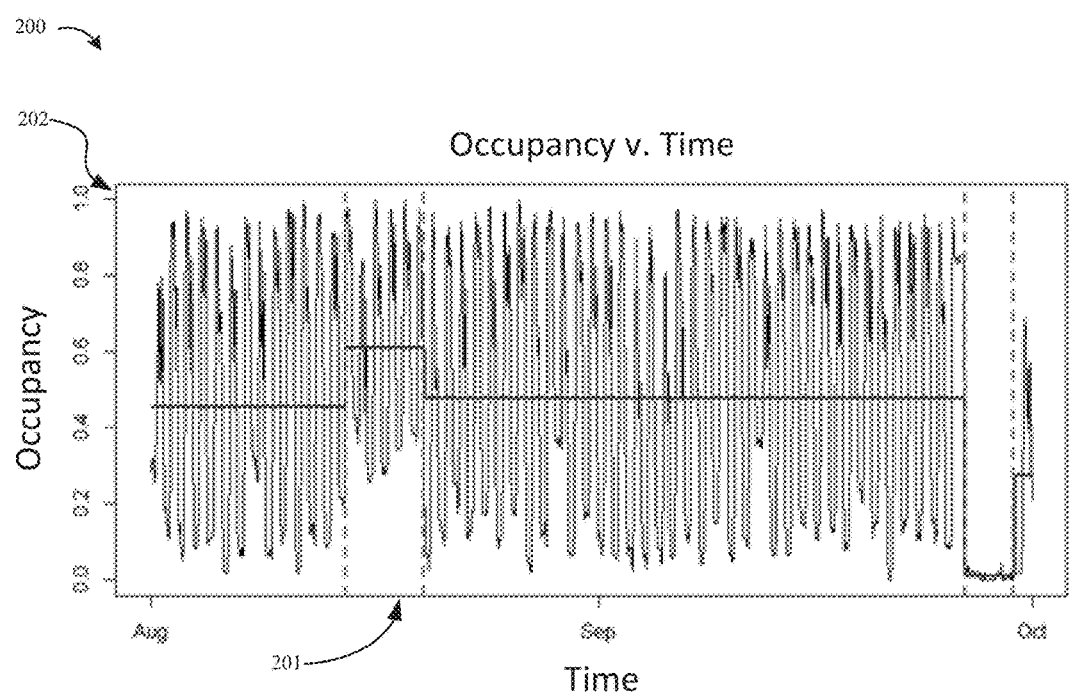
FIG. 2 is a representation of a function for the occupancy of a street section for a particular time period, determined according to an example embodiment of the present invention.

Accordingly, a collection of both data 130 and corresponding occupancy estimates 140 can be determined for a particular street section over a particular period of time. Based on this collected information, the relationship between occupancy of particular street section to a particular time period can be determined. FIG. 2 graphically illustrates one particular example of the occupancy estimates 140 determined over a particular period of time according to an example embodiment. Graph 200 includes horizontal axis 201 corresponding to the particular time period. For example, axis 201 shown in the figure corresponds to a period of time beginning in the month of August of a particular year to the month of October of the same year. Graph 200 further includes vertical axis 202 corresponding to occupancy estimate 140. For example, axis 202 shown in the figure begins at 0.0, corresponding to no occupancy, and ends at 1.0, corresponding to where the street section is completely occupied.

In an example embodiment, in a case where there are any gaps in the occupancy time series of a particular street section, the determination of the occupancy estimate includes initially performing imputation of missing data to fill in the gaps in the occupancy estimate 140. The missing data can be a result of a street section not being visited by vehicles as frequently as needed for adequate data population. For instance, if the goal is to provide parking occupancy of a street on an hourly basis, data from at least one car driving through the street in each hour would be required to provide an occupancy estimation. If there is one hour during which no car visits the street, then there is a missing point in the time series, which would, for example, result in a gap in the graph shown in FIG. 2.

In some examples, the imputation of the missing data is performed based on data of other times at the same street section being considered. In other examples, the imputation of the missing data is performed based on data of other nearby streets at the same time being considered.

For example, in an example embodiment imputing missing data based on data of other times, missing data is filled using Bayesian structural time series (BSTS) models. (See, e.g., "Bayesian structural time series," available at the webpage titled en.wikipedia.org/wiki/Bayesian_structural_time_series). This method works by using a moving window going forward and backward in the time series, and filling in the missing data with forecasts from the BSTS model. For instance, if there are 60 hours of data, but the $11^{th}$ hour is missing, a model can be trained on the first to tenth hours to predict the eleventh hour's occupancy, or a model can be trained on the twelfth to twenty-first hour to predict the eleventh hour's occupancy.

On the other hand, in an alternative example embodiment imputing data based on data of neighboring streets, missing data is filled using streets concerning which the system includes information indicating them as being sufficiently close to the street for which there is missing data, so that there is an expected high correlation between the subject street and the neighboring streets, the data of which are used for imputing the missing data.

In an example embodiment, the missing data is imputed by applying an Amelia process. (See, e.g., Honaker et al., "AMELIA II: A Program for Missing Data" (2015), available at the webpage titled cran.r-project.org/web/packages/Amelia/vignettes/amelia.pdf.) According to this example, the missing data is filled with a "missing at random" assumption and a prediction of the street's occupancy time series with missing values using other streets via linear regression.

In an alternative example embodiment, the missing data is imputed by applying a Multivariate Imputation by Chained Equations (MICE)), which is a bootstrapped based EM (Expectation-Maximization) algorithm that also assumes "missing at random." (See, e.g., Buuren et al., "mice: Multivariate Imputation by Chained Equations in R" (2011), available at the webpage titled jstatsoft.org/article/view/v045i03.)

In an alternative example embodiment, the missing data is imputed using missForest, which is a random forest based method that does not require parametrization, with no assumption on the functional form. (See, e.g., Stekhoven, "Using the missForest Package" (2011), available at the webpage titled stat.ethz.ch/education/semesters/ss2013/ams/paper/missForest_1.2.pdf.)

Returning to FIG. 1, at step 105, pattern change detection 150 determines if there are any anomalies present in a particular occupancy estimate 140. These anomalies can be, for example, due to an external event that can impact occupancy estimate 140, as discussed below. At step 106, forecast occupancy estimate 160 is calculated based on historical occupancy estimates previously calculated. For example, in an example embodiment, forecast occupancy estimate 160 is calculated using various time series forecasting algorithms, such as Seasonal Auto-Regressive Integrated Moving Average (SARIMA) models and regression models. In this manner, auto-correlation analysis is first performed to estimate a trend and seasonality in the historical occupancy estimates, which are subsequently used to determine parameter values in the forecasting algorithms. Next, different model types and parameter settings are compared, to determine the best model that provides the highest average accuracy across all prediction points.

Figure 3:
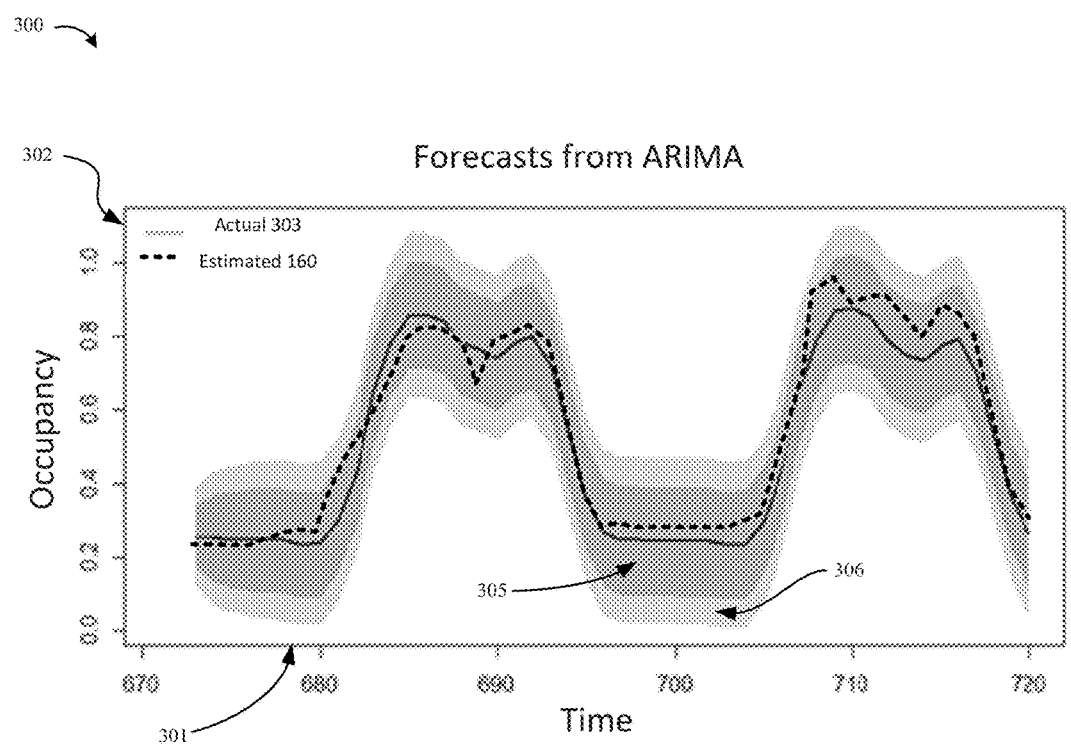
FIG. 3 is a representation of a function for the forecasted occupancy of a street section for a particular time period, according to an example embodiment of the present invention.

FIG. 3 illustrates an example of one particular time series forecasting model. In particular, FIG. 3 illustrates forecast occupancy estimate 160 generated using an Auto-Regressive Integrated Moving Average (ARIMA) model. FIG. 3 includes graph 300 having horizontal axis 301 corresponding to a particular time period and vertical axis 302 corresponding to occupancy, either actual occupancy 303 or forecast occupancy estimate 160. Furthermore, graph 300 shown in FIG. 3 includes confidence levels 305 and 306, which indicate different levels of confidence associated with the results of the particular forecasting model.

Figure 4A:
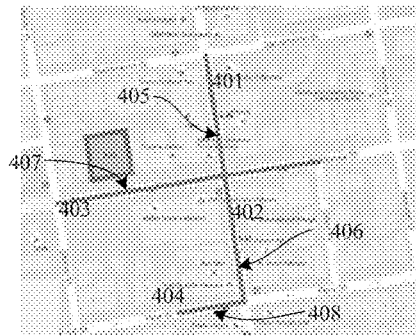
FIGS. 4A-4E depict maps on which forecasted occupancies of multiple street sections during particular time periods are displayed, according to an example embodiment of the present invention.
Figure 4B:
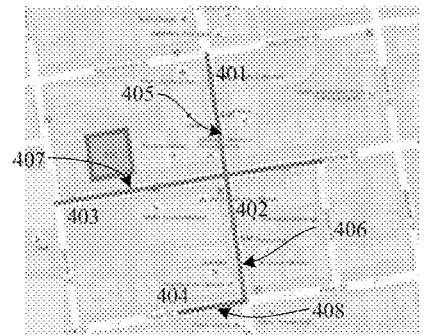
Figure 4C:
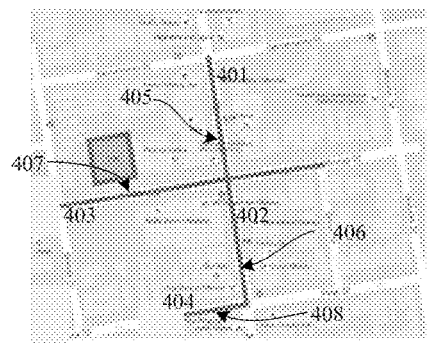
Figure 4D:
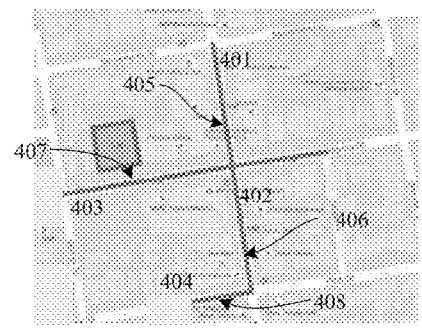
Figure 4E:
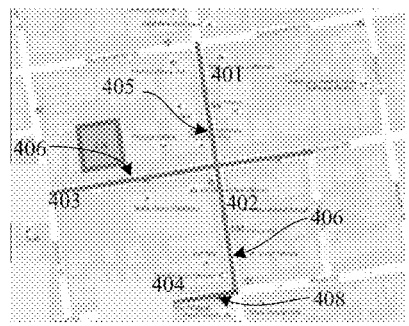

Returning back to FIG. 1, at step 107, forecast occupancy estimate 160 is displayed, for example, on a map. FIGS. 4A-4E illustrate an example embodiment of displays of forecast occupancy estimate 160 on various maps. For example, FIGS. 4A-4E illustrate various street sections, 401, 402, 403, and 404 and their corresponding forecast occupancy estimates 405, 406, 407, and 408, graphically illustrated as highlighted street sections. In the illustrated example, forecast occupancy estimates 405-408 are superimposed onto street sections 401-404, and, using a particular color scheme, the level of occupancy can be visually shown (although the highlighted street sections are shown as bolded grey sections in the figure, they can instead be color highlighted with an assigned color coding, with different sections being highlighted in different colors). For example, a color scheme ranging from green to red can be used, where green indicates a low occupancy, yellow indicates average occupancy, orange indicates above average occupancy, and red indicates high occupancy. For example, in FIG. 4A, street sections 401-404 can all have average occupancy levels, which can be illustrated by representing forecast occupancy estimates 405-408 in yellow (i.e., average occupancy level). FIG. 4A can, for example, indicate the occupancy of street sections 401-404 at 12 AM midnight on a particular day. Street sections 401-404, as shown in FIG. 4B, can have different occupancy estimates. For example, sections 402 and 404 can be shown to be more occupied than street sections 401 and 403; therefore, forecast occupancy estimates 406 and 408 can be illustrated with an orange color, indicating above average occupancy, and forecast occupancy estimates 405 and 407 can remain illustrated in yellow, indicating average occupancy. FIG. 4B can, for example, indicate the occupancy of street sections 401-404 at 6 AM on the same day as illustrated in FIG. 4A. Street sections 401-404, as shown in FIG. 4C, can also have different occupancy estimates. For example, sections 402-404 can be significantly more occupied than section 401; therefore, forecast occupancy estimates 406-408 can be illustrated with a red color, indicating high occupancy, and forecast occupancy estimate 405 can be illustrated with an orange color, indicating above average occupancy. FIG. 4C can, for example, indicate the occupancy of street sections 401-404 at 12 PM noon on the same day as illustrated in FIGS. 4A-4B. Street sections 401-404, as shown in FIG. 4D, can have the same occupancy estimates. For example, sections 401-404 can be significantly occupied; therefore, forecast occupancy estimates 405-408 can be illustrated with a red color, indicating a high occupancy. FIG. 4D can, for example, indicate the occupancy of street sections 401-404 at 6 PM noon on the same day as illustrated in FIGS. 4A-4C. Street sections 401-404, as shown in FIG. 4E, can also have different occupancy estimates. For example, sections 401-403 can be less occupied than section 404; therefore, forecast occupancy estimates 405-407 can be illustrated with a yellow color, indicating an average occupancy, and forecast occupancy estimate 408 can be illustrated with an orange color, indicating above average occupancy. FIG. 4E can, for example, indicate the occupancy of street sections 401-404 at 12 AM midnight the day following the day that is illustrated in FIGS. 4A-4D.

Returning back to FIG. 1, in one particular embodiment, at step 108, confidence level 170 is also be displayed, for example, e.g., by displaying a numerical value corresponding to the confidence level of the time series forecasting model used to determine the occupancy forecast. Confidence level 170 corresponds to an evaluation of the accuracy of the forecast occupancy estimates 160 calculated by the various time series forecasting algorithms, for example, as shown by confidence levels 305 and 306 in FIG. 3.

Figure 5:
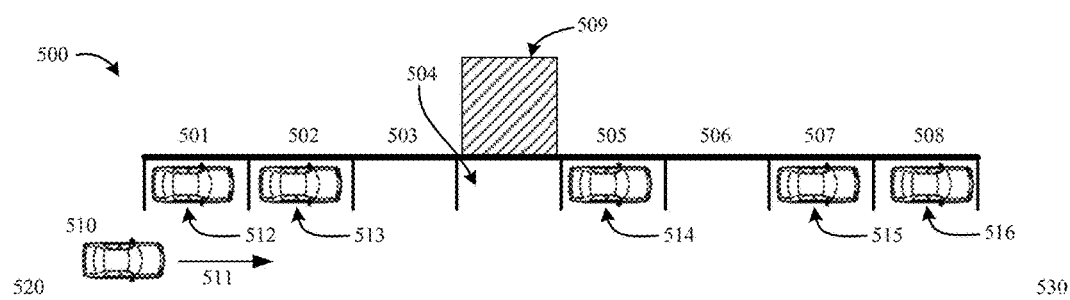
FIG. 5 is a diagram corresponding to a method of determining occupancy of a street section according to an example embodiment of the present invention.

In one particular embodiment, determining an occupancy estimate for a street section is calculated for a section of street that has defined parking areas, i.e., that has predefined, marked (i.e., painted) parking areas so that a particular street section has a corresponding integer corresponding to a total number of parking areas for that particular street section. In this embodiment, an occupancy estimate can be determined based on 1) a total number of detected unoccupied parking areas, 2) an estimated number of historically falsely detected parking areas, and 3) a total number of detected parking areas. For example, FIG. 5 is a diagram depicting street section 500 having beginning section 520 and end section 530 and includes defined parking areas 501, 502, 503, 504, 505, 506, 507, and 508. Street section 500 further includes driveway 509, which is obstructing parking area 504 (i.e., a vehicle cannot legally or physical park in parking area 504). As vehicle 510 drives down street section 500 in direction 511, vehicle 510 detects the presence of occupied parking areas 501, 502, 505, 507, and 508, parked vehicles 512, 513, 514, 515, and 516 parked in defined parking areas 501, 502, 505, 507, and 508, respectively. Vehicle 510 also detects unoccupied parking areas 503, 504, and 506.

As shown in FIG. 5, 504 is a falsely detected parking area and corresponds to obstructed parking areas, e.g., a driveway, fire hydrant, a no-parking zone, etc. In order to determine that 504 is a falsely detected parking area, parking information of a particular street section can be obtained over a period of time by vehicles traveling through the street section. In this manner, each time a vehicle travels through a particular street section, a total number of parking areas and a total number of parked vehicles are obtained. If over time a number of vehicles detect a total number of parking areas equal to 10, then the street section is assumed to have a total of 10 parking areas. However, if over a predefined period of time, no vehicle detects more than 9 parked vehicles, then it can be assumed that one parking area of the particular street section is an obstructed parking area, i.e., a false detection. Accordingly, this particular street section is identified as having one falsely detected parking area.

In an example, based on the detected parking areas and falsely detected parking areas, a count occupancy estimate for street section 200 is calculated as follows:

$$\text{Occupancy Estimate (Count)} = 1 - \left(\frac{N_{det} - N_{false}}{N_{total} - N_{false}}\right),$$

where $N_{det}$ represents a total number of detected unoccupied parking areas, e.g., unoccupied parking areas 503, 504, and 506, as shown in FIG. 5; $N_{false}$ represents an estimated number of historically falsely detected parking areas, e.g., parking area 504, which is obstructed by driveway 509, as shown in FIG. 5; and $N_{total}$ represents a total number of parking areas on the particular section of street, e.g., 501, 502, 503, 504, 505, 506, 507, and 508. Accordingly, the count occupancy estimate of street section 500, as shown in FIG. 5, is 72% occupied.

Figure 6:
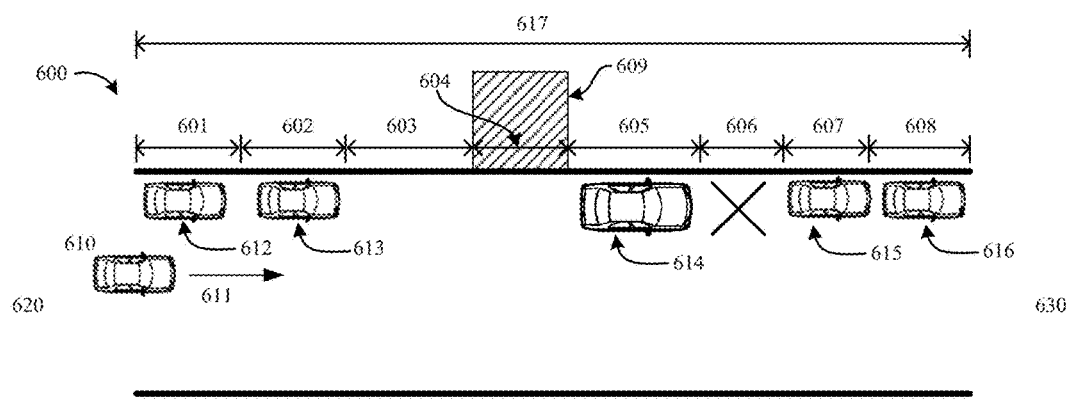
FIG. 6 is a diagram corresponding to a method of determining occupancy of a street section according to an example embodiment of the present invention.

In one particular embodiment, the determination of an occupancy estimate is for a section of street that does not have defined parking areas (i.e., unmarked and/or unpainted parking areas). (It is noted that, in an example embodiment, the system is configured to perform the determinations for both types of street sections.) In this embodiment, a length occupancy estimate can be used. The length occupancy estimate can be calculated based on 1) an average length of a vehicle, 2) lengths of determined unoccupied parking areas, 3) lengths of the areas of an estimated number of historically falsely detected parking areas, and 4) a total length of the street section. In this manner, based on the average length of a vehicle, unoccupied parking areas that do not have sufficient length for parking are excluded from the occupancy calculation. For example, if an average length of a vehicle is predefined to be 15 feet, then an unoccupied area with a length of 10 feet is disregarded and not considered an unoccupied parking area. In this manner, it is ensured that each detected unoccupied parking area has a length sufficiently large enough so that a particular vehicle is capable of maneuvering and parking in the unoccupied parking area. In order to achieve this result, minimum and maximum length thresholds can be used when determining if a detected parking area is sufficiently large for a vehicle to maneuver and park. For example, FIG. 6 depicts street section 600 having beginning section 620 and end section 630 and includes parking areas 601, 602, 603, 604, 605, 606, 607, and 608 with respective lengths. Street section 600 further includes driveway 609, which is obstructing parking area 604. As vehicle 610 drives down street section 600 in direction 611, vehicle 610 detects the lengths of occupied parking areas 601, 602, 605, 607, and 608 and the lengths of unoccupied parking areas 603, 604, and 606. Furthermore, vehicle 610 detects the presence of parked vehicles 612, 613, 614, 615, and 616 parked in parking areas 601, 602, 605, 607, and 608, respectively. In this example, the length of parking area 606 is less than the selected average length of a vehicle, and, therefore, parking area 606 and its length are disregarded and not used for the calculation of the occupancy of the street section.

Based on the foregoing, in an example embodiment, a length occupancy estimate for street section 600 is calculated as $$\text{Occupancy Estimate (Length)} = 1 - \left(\frac{\sum L_{det} - \sum L_{false}}{L_{length\_total\_avg} - \sum L_{false}}\right),$$

where $\Sigma L_{det}$ represents a total length of detected unoccupied parking areas for a vehicle on a particular section, which does not include any length of unoccupied parking areas that are shorter than the length of an average car, e.g., the sum of the lengths of unoccupied parking areas 603 and 604, as shown in FIG. 6; $\Sigma L_{false}$ represents a total length of the areas of the estimated number of historically falsely detected parking areas for a vehicle on the particular section of street, e.g., length 604, which is obstructed by driveway 609, as shown in FIG. 6; and $L_{length\_total\_avg}$ is the total length of street section 600.

In alternative example embodiment, the determination of the occupancy estimate for a section of street that does not have defined parking areas is performed in an alternative manner that is similar to the length occupancy estimate, but instead of using an average length of the vehicle, the actual length of the car attempting to park is used. Accordingly, a car-based occupancy estimate is calculated based on 1) a length of a vehicle attempting to park, 2) lengths of determined unoccupied parking areas, 3) lengths of the areas of an estimated number of historically falsely detected parking areas, and 4) a total length of the street section. In this manner, based on the length of the actual car attempting to park, unoccupied parking areas that are too small are identified and not considered for the calculation of the occupancy of the street section. For example, if the length of the car attempting to park is 10 feet, then, for example, an unoccupied parking area with a length of 8 feet is disregarded and not considered an unoccupied parking area, but an unoccupied parking area with a length of 11 feet is considered an unoccupied parking area. The car-based occupancy estimate is calculated, for example, as $$\text{Occupancy Estimate (car\_based)} = 1 - \left(\frac{\sum L_{det} - \sum L_{false}}{L_{length\_total\_avg} - \sum L_{false}}\right),$$

where $\Sigma L_{det}$ represents a total length of the detected unoccupied parking areas, which does not include any length of unoccupied parking areas that are determined to have an insufficient length of parking for a particular car; $\Sigma L_{false}$ represents a total length of the areas of the estimated number of historically falsely detected parking areas for a vehicle on the particular section of street; and $L_{length\_total\_car}$ represents the total length of the street section.

In this manner, a car-based occupancy estimate is calculated, which is a more tailored occupancy estimate, since unoccupied parking areas are selected to correspond to a specific length of the particular vehicle attempting to park.

Based on the foregoing, each time a vehicle (that includes the requisite sensing, calculation, and communication device(s)) drives through a particular street section, a corresponding occupancy estimate can be calculated. Thus, over time, each street section can be associated with a collection of stored occupancy estimates. Based on the collected occupancy estimates, a forecast occupancy estimate can be calculated using various time series forecasting models, as discussed above.

In one example embodiment, when a forecast occupancy estimate is calculated for a particular street section for a particular period of time, pattern change detection 150 can determine if there are any anomalies impacting a particular occupancy estimate 140. In this manner, the forecast occupancy estimate can be checked to determine if any anomalies (i.e., special or external events) exist for that particular street section during the particular time period of the forecast occupancy estimate. For example, external data can be analyzed to determine if the particular period of time during which the forecast occupancy estimate is calculated coincides with, for example, a public holiday, public event, or some other event that would impact the availability of parking in the particular street section during the particular time period. In this manner, the anomalies can negatively affect the ability of time series forecasting models to generate an accurate forecast occupancy estimate. Therefore, it is advantageous to take into consideration any of these potential events that coincide with the forecast occupancy estimate so that the impact of the external event can be accounted for, and an improved occupancy estimate can be calculated.

Moreover, it is advantageous for pattern change detection 150 to accurately predict the magnitude of the impact of an anomalous event on the availability of parking. The magnitude of the impact can be calculated based on a combination of data recently collected from vehicles traveling down the particular street section during a particular external event combined in a Bayesian framework with data periods of time where a similar, external event occurred.

In one particular embodiment, when a forecast occupancy estimate is calculated for a particular street section for a particular period of time, pattern change detection 150 can determine if any unforeseen, external events are impacting the parking occupancy. For example, the particular street section may be experiencing repairs or construction that prevents vehicles from parking in certain parking areas that would otherwise be available for parking. In this manner, it is advantageous to accurately detect from collected data corresponding to the particular street section whether or not the particular street section is experiencing any unforeseen, external events such as road construction and to determine the magnitude of the impact of such an event on the forecast occupancy estimate. The existence of an unforeseen, external event and its corresponding impact can be determined using non-parametric multiple change point analysis methods. Moreover, parameters, such as a minimum number of observations between change points, of the non-parametric multiple change point algorithm can be adjusted so that multiple change points can be detected without assuming any underlying distribution. When a change is detected, pattern change detection 150 can perform an analysis of the cause is performed, and if the unforeseen, external event is determined to be a repeating event, the existence and its corresponding impact on the availability of parking can be characterized as a special event, which increases the accuracy of the forecast occupancy estimate.

An example embodiment of the present invention is directed to processing circuitry, e.g., including one or more processors, which can be implemented using any conventional processing circuit and device or combination thereof, e.g., a Central Processing Unit (CPU) of a Personal Computer (PC) or other workstation processor, to execute code provided, e.g., on a non-transitory computer-readable medium including any conventional memory device, to perform any of the methods described herein, alone or in combination. The one or more processors can be embodied in a server or user terminal or combination thereof. The user terminal can be embodied, for example, as a desktop, laptop, hand-held device, Personal Digital Assistant (PDA), television set-top Internet appliance, mobile telephone, smart phone, etc., or as a combination of one or more thereof. The memory device can include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

An example embodiment of the present invention is directed to a plurality of ascertaining vehicles that perform detections regarding current parking area states along a street section. The plurality of ascertaining vehicles can transmit the detected parking area states to a server. The server accumulates the detected parking area states in order to create a forecasted occupancy estimate based on the detected parking area states. The server can transmit the forecasted occupancy estimate to the plurality of ascertaining vehicles, to a user terminal, for example, a desktop, laptop, hand-held device, Personal Digital Assistant (PDA), television set-top Internet appliance, mobile telephone, smart phone, etc., or to an additional server. The ascertaining vehicle, user terminal, or server can then display the forecasted occupancy estimate using a display device.

The forecasted occupancy estimate does not necessarily mean forecasted for the future, but the forecasted occupancy estimate can also be an estimate of the current parking states along the street section for which there presently is no sensed actual information, the forecasted occupancy estimate being determined from historical information as described above. The forecasted occupancy estimate can be sent to vehicles, including an ascertaining vehicle (i.e., vehicles that send information regarding the current parking area states along a street section to a server) and also vehicles that have not and/or do not send such information.

An example embodiment of the present invention is directed to one or more non-transitory computer-readable media, e.g., as described above, on which are stored instructions that are executable by a processor and that, when executed by the processor, perform the various methods described herein, each alone or in combination or sub-steps thereof in isolation or in other combinations.

An example embodiment of the present invention is directed to a method, e.g., of a hardware component or machine, of transmitting instructions executable by a processor to perform the various methods described herein, each alone or in combination or sub-steps thereof in isolation or in other combinations.

The above description is intended to be illustrative, and not restrictive. Those skilled in the art can appreciate from the foregoing description that the present invention can be implemented in a variety of forms, and that the various embodiments can be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. A method for aiding finding of available parking areas of a street section, the method comprising:
   receiving, by processing circuitry, data corresponding to parking areas situated in a street section, the data being ascertained by at least one ascertaining vehicle driving through the street section, wherein the received data includes a number of parking areas estimated to have been historically estimated falsely determined by:
      detecting a total number of parking areas in the street section;
      detecting a total number of vehicles parked in the street section; and
      determining that a parking area has been historically estimated falsely based on the total number of parking areas in the street section and the total number of vehicles parked in the street section;
   determining, by the processing circuitry, an instantaneous occupancy estimate of the street section based on the received data;
   calculating, by the processing circuitry, a forecasted occupancy estimate based on the instantaneous occupancy estimate, wherein the forecasted occupancy estimate is calculated using time series forecasting models;
   generating, by the processing circuitry, a display representation of the calculated forecasted occupancy estimate; and
   providing the display representation for display on a display device.

2. The method of claim 1, wherein the receiving the data and the determining the instantaneous occupancy estimate are performed each time at least one of the at least one ascertaining vehicle drives through the street section.

3. The method of claim 2, wherein the forecasted occupancy estimate is calculated using a Seasonal Auto-Regressive Integrated Moving Average (SARIMA) model.

4. The method of claim 2, wherein the display representation includes a visual representation of the forecasted occupancy estimate on a map using a color scale to visually represent a level of occupancy of the street section.

5. The method of claim 2, wherein the forecasted occupancy estimate is modified based an external event impacting the occupancy of the street section.

6. The method of claim 2, wherein the display representation includes a confidence level of the forecasted occupancy estimate.

7. The method of claim 1, wherein the received data includes: 1) a total number of unoccupied parking areas; 2) the number of parking areas estimated to have been historically estimated falsely; and 3) a total number of parking areas located on the street section.

8. The method of claim 7, wherein:
   the instantaneous occupancy estimate is determined by $$1 - \left( \frac{N_{det} - N_{false}}{N_{total} - N_{false}} \right);$$

$N_{det}$ represents the total number of unoccupied parking areas;

$N_{false}$ represents the number of parking areas estimated to have been historically estimated falsely; and $N_{total}$ represents the total number of parking areas located on the street section.

9. The method of claim 1, wherein the received data includes: 1) an average length of a vehicle; 2) lengths of determined unoccupied parking areas; 3) lengths of parking areas estimated to have been historically estimated falsely; and 4) a total length of the street section.

10. The method of claim 9, wherein:
    the instantaneous occupancy estimate is determined by $$1 - \left( \frac{\sum L_{det} - \sum L_{false}}{L_{length\_total\_avg} - \sum L_{false}} \right);$$

$\sum L_{det}$ represents a total length of the detected unoccupied parking areas;

$\sum L_{false}$ represents a total length of the parking areas estimated to have been historically estimated falsely; and $L_{length\_total}$ represents the total length of the street section.

11. The method of claim 1, wherein the received data includes: 1) a length of a vehicle attempting to park; 2) lengths of determined unoccupied parking areas; 3) lengths of parking areas estimated to have been historically estimated falsely; and 4) a total length of the street section.

12. The method of claim 11, wherein:
    the instantaneous occupancy estimate is determined by $$1 - \left( \frac{\sum L_{det} - \sum L_{false}}{L_{lenght\_total\_car} - \sum L_{false}} \right);$$

$\sum L_{det}$ represents a total length of the detected unoccupied parking areas;

$\sum L_{false}$ represents a total length of the parking areas estimated to have been historically estimated falsely; and $L_{length\_total}$ represents the total length of the street section.

13. A server system for aiding finding of available parking areas of a street section, the server comprising:
    a database; and
    a processing unit, wherein the processing unit is configured to perform the following:
       receive data corresponding to parking areas situated in a street section, the data being ascertained by at least one ascertaining vehicle driving through the street section, wherein the received data includes a number of parking areas estimated to have been historically estimated falsely determined by:
          detecting a total number of parking areas in the street section;
          detecting a total number of vehicles parked in the street section; and
          determining that a parking area has been historically estimated falsely based on the total number of parking areas in the street section and the total number of vehicles parked in the street section;
       determine an instantaneous occupancy estimate of the street section based on the received data;
       calculate a forecasted occupancy estimate based on the instantaneous occupancy estimate, wherein the forecasted occupancy estimate is calculated using time series forecasting models;

generate a display representation of the calculated forecasted occupancy estimate; and provide the display representation for display on a display device.

14. The server system of claim 13, wherein the receipt of the data and the determination of the instantaneous occupancy estimate are repetitively performed each time a vehicle drives through the street section.

15. The server system of claim 14, wherein the forecasted occupancy estimate is calculated using a Seasonal Auto-Regressive Moving Average (SARIMA) model.

16. The server system of claim 14, wherein the display representation includes a visual representation of the forecasted occupancy estimate on a map using a color scale to visually represent a level of occupancy of the street section.

17. The server system of claim 13, wherein the received data includes: 1) a total number of unoccupied parking areas; 2) the number of parking areas estimated to have been historically estimated falsely; and 3) a total number of parking areas located on the street section.

18. The server system of claim 13, wherein the received data includes: 1) an average length of a vehicle; 2) lengths of determined unoccupied parking areas; 3) the lengths of parking areas estimated to have been historically estimated falsely; and 4) a total length of the street section.

19. The server system of claim 13, wherein the received data includes: 1) a length of a vehicle attempting to park; 2) lengths of determined unoccupied parking areas; 3) lengths of parking areas estimated to have been historically estimated falsely; and 4) a total length of the street section.

20. A non-transitory computer-readable medium on which are stored instructions that are executable by a computer processor and that, when executed by the processor, cause the processor to perform a method for aiding finding of available parking areas of a street section, the method comprising:

receiving data corresponding to parking areas situated in a street section, the data being ascertained by at least one ascertaining vehicle driving through the street section, wherein the received data includes a number of parking areas estimated to have been historically estimated falsely determined by:

detecting a total number of parking areas in the street section;

detecting a total number of vehicles parked in the street section; and determining that a parking area has been historically estimated falsely based on the total number of parking areas in the street section and the total number of vehicles parked in the street section;

determining an instantaneous occupancy estimate of the street section based on the received data;

calculating a forecasted occupancy estimate based on the instantaneous occupancy estimate, wherein the forecasted occupancy estimate is calculated using time series forecasting models;

generating a display representation of the calculated forecasted occupancy estimate; and providing the display representation for display on a display device.

* * * * *